United States Patent
Humphrey et al.

(10) Patent No.: US 12,332,350 B2
(45) Date of Patent: Jun. 17, 2025

(54) SYSTEM AND METHOD FOR ORTHOGONAL LASER METROLOGY

(71) Applicant: PLX, Inc., Deer Park, NY (US)

(72) Inventors: Malcolm George Humphrey, West Sussex (GB); Itai Vishnia, Setauket, NY (US)

(73) Assignee: PLX, Inc., Deer Park, NY (US)

( * ) Notice: Subject to any disclaimer, the term of this patent is extended or adjusted under 35 U.S.C. 154(b) by 1107 days.

(21) Appl. No.: 17/224,279

(22) Filed: Apr. 7, 2021

(65) Prior Publication Data

US 2022/0326379 A1    Oct. 13, 2022

(51) Int. Cl.
*G01S 17/06* (2006.01)
*G01B 21/22* (2006.01)
*G01S 7/481* (2006.01)
*G01S 17/88* (2006.01)

(52) U.S. Cl.
CPC ............. *G01S 17/06* (2013.01); *G01B 21/22* (2013.01); *G01S 7/4814* (2013.01); *G01S 7/4816* (2013.01); *G01S 7/4817* (2013.01); *G01S 17/88* (2013.01)

(58) Field of Classification Search
CPC ...... G01S 17/06; G01S 7/4814; G01S 7/4816; G01S 7/4817; G01S 17/88; G01S 17/42; G01S 17/95; G01B 21/22; G01C 15/002
See application file for complete search history.

(56) References Cited

U.S. PATENT DOCUMENTS

| 5,838,239 A * | 11/1998 | Stern | ...................... B64D 15/20 356/369 |
| 2008/0170238 A1 * | 7/2008 | Ochi | ...................... G01B 11/25 356/610 |

OTHER PUBLICATIONS

Shortis, Mark R., Timothy A. Clarke, and Tim Short. "Comparison of some techniques for the subpixel location of discrete target images." Videometrics III. vol. 2350. International Society for Optics and Photonics, 1994.

* cited by examiner

*Primary Examiner* — Michael C Zarroli
(74) *Attorney, Agent, or Firm* — ICE MILLER LLP; Safet Metjahic

(57) ABSTRACT

A system, device and methodology for detecting an object and its position in a field of view of a beam fan. The system can comprise a reflection detector sensor array arranged to detect a light beam reflected by an object impinged by a beam fan in the field of view and output a reflected beam position trigger signal; a line sensor arranged to capture an image of the reflected light beam and output beam reflection data corresponding to the light beam; an angle position sensor array arranged to detect an angle of the beam fan with respect to a central axis and output a beam fan position signal; and a speedup processor arranged to receive the reflected beam position trigger signal, receive the beam reflection data, receive the beam fan position signal, and output the beam reflection data to a central processor. A position of the object in the field of view can be determined based on the beam reflection data and beam fan position signal.

27 Claims, 9 Drawing Sheets

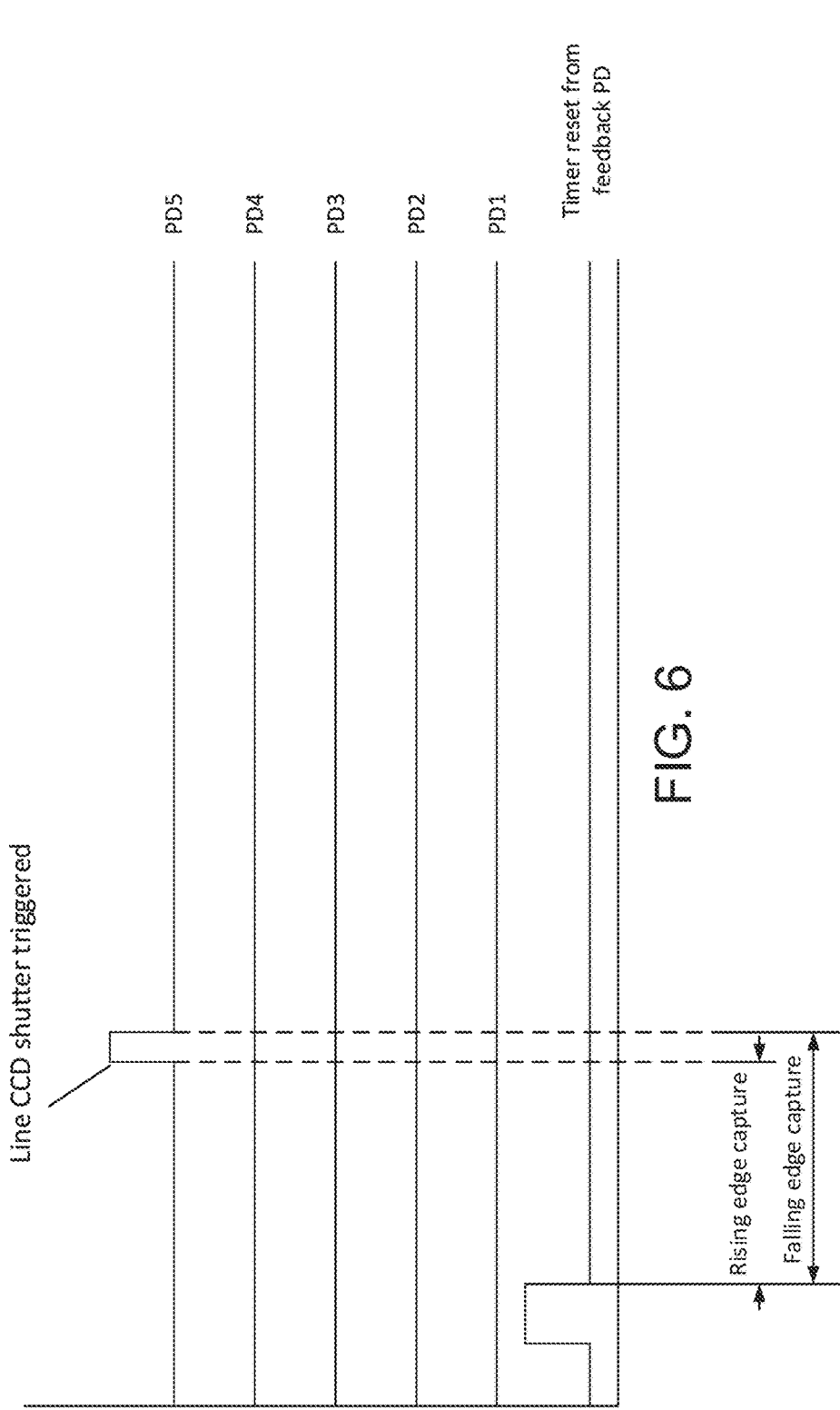
FIG. 6
FIG. 7

SYSTEM AND METHOD FOR ORTHOGONAL LASER METROLOGY

FIELD OF THE DISCLOSURE

The present disclosure relates generally to optics, electronics, laser technology and computer program code for metrology, and specifically to a sensor device, a method, and a system for implementing orthogonal laser metrology for detection, measurement, monitoring, identifying or tracking, including, but not limited to, size, shape, orientation, location or motion of an object, a surface or a target in multi-dimensional space.

BACKGROUND OF THE DISCLOSURE

Modern industrial metrology applications typically use photogrammetry or laser tracker technologies. Photogrammetry technologies typically use two or more video cameras with a known distance between the cameras. The cameras are used to image a series of retroreflectors that are placed on targets within the scene. These are typically coded such that the computer software can distinguish the identity of each reflective target. Each image is processed to identify the center of each reflector within the image. This is then converted to an X/Y angle for each reflector. By triangulating with the data from the second camera, the position of each reflector can be determined.

Laser tracker technologies, on the other hand, typically use a mechanically steered precision laser rangefinder using interferometry to sense distance. The bearing is measured using precision encoders on the beam steering mechanics. These typically track a single corner cube retroreflector.

The inventor has found that both photogrammetry and laser tracker technologies can be unsuitable for many metrology applications. For instance, photogrammetry technologies can be unsuitable where high precision detection is necessary; and, laser tracker technologies can be unsuitable due to their prohibitive cost. It is in this regard, as well as other problems in the art, that the present disclosure is directed. The present disclosure provides a technological innovation that is suitable for such, and other, metrology applications, including applications that use real-time control to correct motion of a robot or mechanical system.

SUMMARY OF THE DISCLOSURE

The disclosure provides a novel orthogonal laser metrology sensor device, system, and computer-implemented method that can be employed in real-time control applications, such as those that require higher precision or lower latency than can be provided by existing metrology technologies.

In a non-limiting embodiment of the disclosure, the sensor system can comprise an orthogonal laser metrology sensor system for detecting an object and its position in a field of view of a beam fan. The system can comprise a reflection detector sensor array arranged to detect a light beam reflected by an object impinged by a beam fan in the field of view and output a reflected beam position trigger signal; a line sensor arranged to capture an image of the reflected light beam and output beam reflection data corresponding to the light beam; an angle position sensor array arranged to detect an angle of the beam fan with respect to a central axis and output a beam fan position signal; and a speedup processor arranged to receive the reflected beam position trigger signal, receive the beam reflection data, receive the beam fan position signal, and output the beam reflection data to a central processor, wherein a position of the object in the field of view is determined based on the beam reflection data and beam fan position signal.

The system in can comprise a centroid determiner module arranged to process the beam reflection data and determine a center of the reflected light beam based on the beam reflection data.

The system can comprise a comparator arranged to compare the reflected beam position trigger signal against a threshold value and output a pulse signal to an input of the speedup processor.

The system can comprise a mirror drive arranged to receive a timing signal from the speedup processor and a control signal from the central processor to drive a scanning mirror.

In an embodiment, the line sensor can include an input for a timing signal from the speedup processor to control the capture of the image of the reflected light beam.

The system can comprise a laser source arranged to emit a laser beam; and an optical system arranged to fan the laser beam to a laser line and focus the laser line along an optical path to a scanning mirror.

In an embodiment, the optical system can comprise a beam splitter system arranged to redirect the reflected light beam to the reflection detector sensor array and the line sensor.

In an embodiment, the beam splitter can comprise a first beam splitter arranged to redirect a portion of the reflected light beam to the reflection detector sensor array; and a second beam splitter arranged to redirect another portion of the reflected light beam to the line sensor.

The system can comprise a scanning mirror arranged to deflect and scan the beam fan in accordance with a scan axis, wherein beam fan is projected in a scan-beam-plane, and wherein the scan axis is perpendicular to scan-beam-plane.

In an embodiment, the speedup processor can comprise a field-programmable gate array.

In an embodiment, the central processor can comprise an advanced RISC machine central processing unit.

In an embodiment, the object can comprise a reflector device.

In a non-limiting embodiment of the disclosure, an orthogonal laser metrology sensor system is provided for detecting an object and its position in a field of view of a beam fan. The system can comprise: a line sensor arranged to capture an image of a light beam reflected by an object impinged by a beam fan in the field of view and output beam reflection data corresponding to the light beam; an angle position sensor array arranged to detect an angle of the beam fan with respect to a central axis and output a beam fan position signal; and a speedup processor arranged to receive the beam reflection data and the beam fan position signal and output the beam reflection data to a central processor, wherein a position of the object in the field of view is determined based on the beam reflection data and the beam fan position signal.

In a non-limiting embodiment of the disclosure, a computer-implemented method is provided for, when executed by one or more processors, performing orthogonal laser metrology to detect an object and its position in a field of view of a beam fan. The method can comprise: detecting a light beam reflected by an object impinged by a beam fan in the field of view; generating a reflected beam position trigger signal based on the reflected light beam; capturing an image of the reflected light beam based on the reflected beam position trigger signal; generating beam reflection data corresponding to the captured image of the reflected light beam; detecting an angle of the beam fan with respect to a central axis; generating a beam fan position signal based on the detected angle of the beam fan; and determining a position of the object in the field of view based on the beam reflection data and the beam fan position signal.

The computer-implemented method can include controlling a scanning mirror based on the beam fan position signal.

The computer-implemented method can comprise scanning beam fan in accordance with a scan axis, wherein beam fan is projected in a scan-beam-plane, and wherein the scan axis is perpendicular to scan-beam-plane.

The computer-implemented method can comprise sending position data to a robot controller, the position data being indicative of the position of the object in real-time.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

FIG. 6 depicts a timing diagram for a non-limiting example of an operation performed by the embodiment of the OLMS device depicted in FIG. 5.

FIG. 7 depicts a non-limiting example of beam reflection data that can be generated by a line sensor and output to a speedup processor in the OLMS device depicted in FIG. 5.

Figure 1:
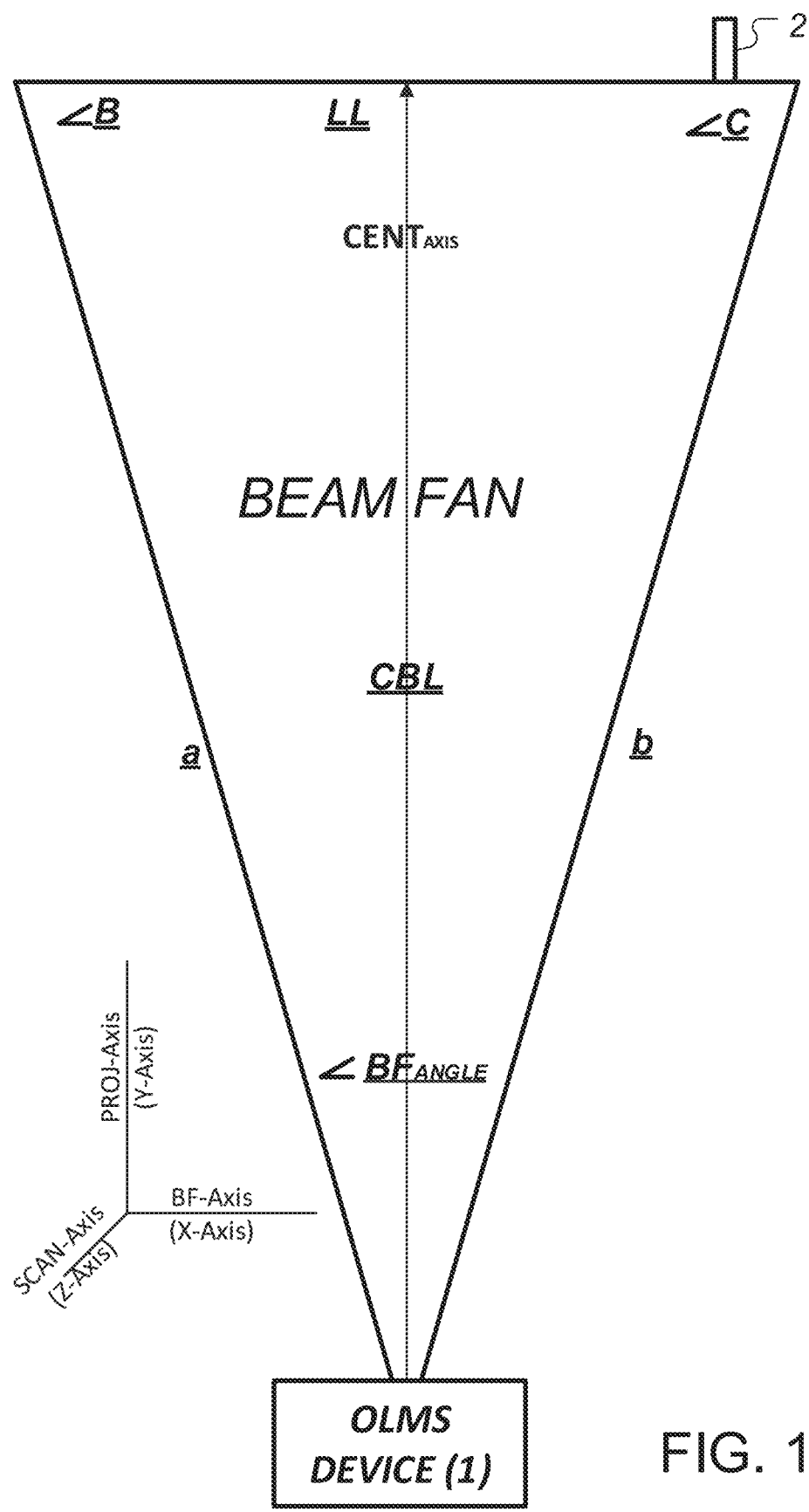
FIG. 1 shows a non-limiting example of an Orthogonal Laser Metrology Sensor (OLMS) system, including an OLMS device and at least one reflector device.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

As noted above, modern metrology applications typically implement photogrammetry or laser tracker technologies. However, such technologies are designed for measurement rather than closed loop control. The technologies often can be unsuitable for real-time control applications, such as, for example, where measurement data is used to correct the motion of a host device or system such as, for example, a robot or a mechanical system in real-time. Their unsuitability for such applications is typically due to their latencies in processing and communicating data, or the prohibitive cost of their hardware components that makes them too expensive to use for certain applications.

Laser tracker technologies are often very expensive, which is due to a large extent because of the precision mechanics and interferometry optical systems that are required to make the technologies work. Thus, such technologies tend to be limited to only those applications where the additional costs are justifiable.

While, photogrammetry technologies are typically less expensive than laser tracker technologies, they lack the precision of laser tracker technologies, making them unsuitable for applications that require high precision performance.

A technological innovation is provided that can be implemented in or with real-time control applications that require precise measurements, precise tracking or monitoring, or low latency communication and data transfer. The technological innovation includes an Orthogonal Laser Metrology Sensor (OLMS) device, an OLMS system and a computer-implemented OLMS method that can be used in real-time control applications, such as, for example, those that require high precision or low latency—for example, higher precision and lower latency than can be provided by photogrammetry or laser tracker technologies. The OLMS device, system or computer-implemented method can provide accuracy that is comparable to, or exceeds, that of laser tracker systems, but at significantly lower cost since the OLMS device and system do not require costly or complex equipment such as, for example, encoders or interferometry subsystems that are necessary for laser tracker systems to operate.

The system includes an OLMS device that is be arranged to fan and scan a laser beam in one or more planes and detect when and where the laser beam encounters an object or surface, including an object such as a reflector device.

FIG. 1 shows a non-limiting embodiment of an OLMS system constructed according to the principles of the disclosure. This embodiment includes a single OLMS device 1 and at least one reflector device 2. Other embodiments are contemplated, including two or more OLMS devices and two or more reflector devices.

The OLMS device 1 can include a laser beam source such as, for example, a solid-state laser, a gas laser, an excimer laser, a dye laser, a semiconductor laser (for example, a laser diode), or any device that can emit a beam of coherent and highly collimated light. The OLMS device 1 can include a laser module having a laser beam source 10, an optical system 20, and a scanning mirror module 50 (shown in FIG. 2A or 2B). The OLMS device 1 can include components 100 to 170, shown in FIG. 5. The OLMS device 1 can be arranged to turn ON/OFF the laser source 10 and, thereby, a laser beam 15 (shown in FIG. 2A) or to adjust the intensity, beam angle, or beam spread of the laser beam 15. The system can include one or more reflector devices in addition to the reflector device 2, any of which can be located external to the OLMS device 1.

The reflector device 2 can include a retroreflector, a retroflector, a cataphote, a corner reflector, a cat's eye reflector, a mirror, or other device or surface that reflects a laser beam or portion of a laser line back to the OLMS device 1 with minimal or nearly no scattering or loss of the laser beam or the portion of the laser line. When the angle of the reflector device 2 is known at the time of reflection, then the angle between OLMS device 1 and the reflector device 2 can be determined. Multiple OLMS devices 1 or multiple reflector devices 2 can be used to determine the range to a target object or surface, as well as the target's position, motion vectors, shape or size. In this regard, triangulation can be used for determining the range.

In an embodiment, a plurality of OLMS devices 1 can be arranged or assembled to provide 360-degree field-of-view. Each OLMS device 1 can be provided as a module. The plurality of OLMS devices 1 can be arranged in any configuration suitable for the application. For instance, in an embodiment, the OLMS devices 1 can be arranged in a circle as discrete modules and arranged for 360-degree field-of-view coverage.

Figure 2A:
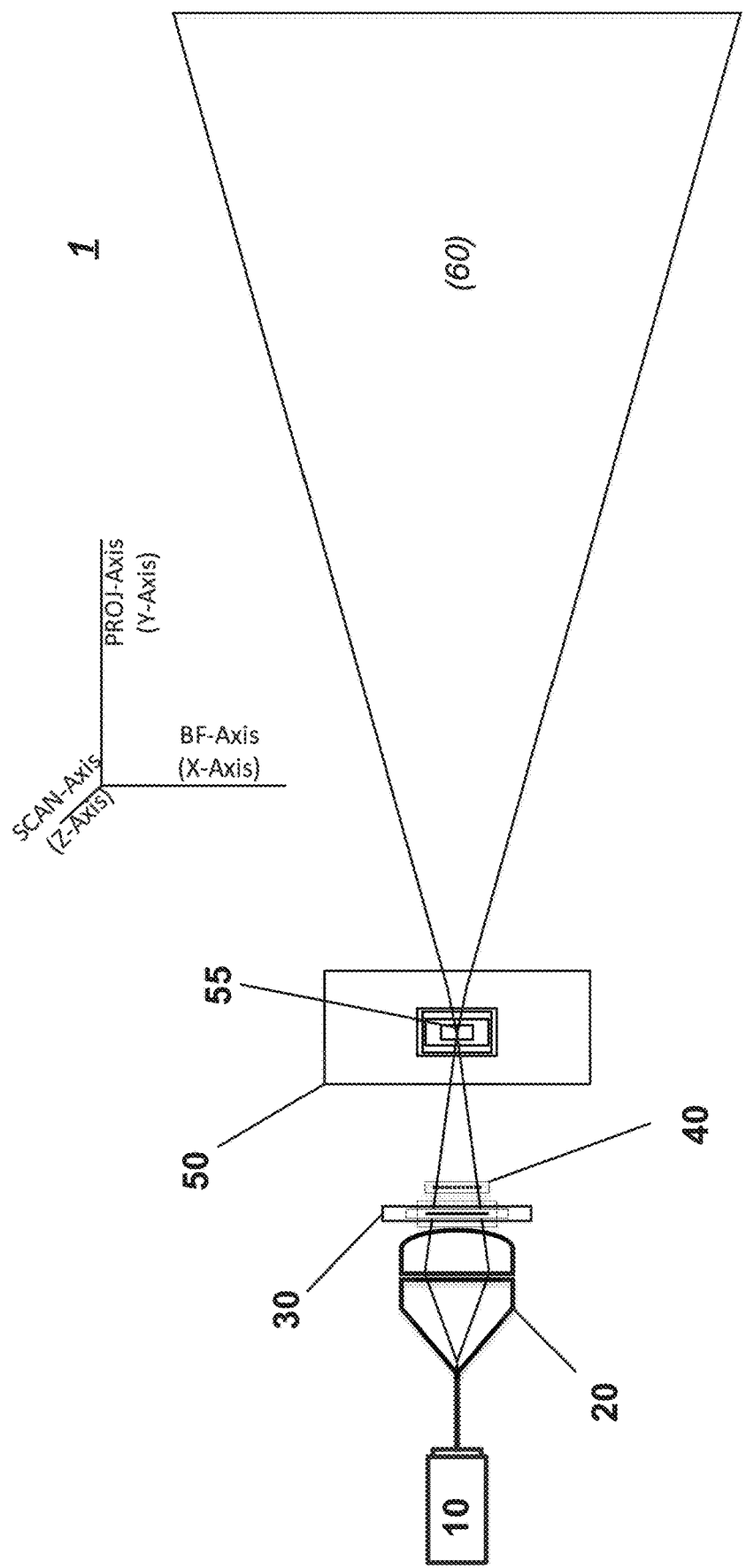
FIG. 2A depicts a top view of a non-limiting embodiment of the OLMS device in FIG. 1.

FIG. 2A shows a non-limiting embodiment of the OLMS device 1. The laser source 10 can be arranged to emit a single coherent laser beam 15 that, when it impinges an object or a surface, it can appear as a single laser dot. The OLMS device 1 can be arranged to fan the laser beam and project a beam fan in a field of view (FOV). The projected beam fan can have a beam fan angle ($BF_{ANGLE}$) such that when the beam fan, or a portion thereof, impinges the object or surface, it appears as a single laser line. The resultant laser line can be orthogonal to the projection axis (PROJ-Axis) of the beam fan.

As seen in FIG. 1, the OLMS device 1 can project a beam fan (BEAM FAN) along the PROJ-Axis (Y-Axis) in the scan-beam-plane (for example, X-Y plane), having the beam fan angle $BF_{ANGLE}$. When it impinges an object or surface, the bean fan can appears as a laser line (LL), with a width that varies as a function of the distance CBL from the OLMS device 1. The OLMS device 1 can be arranged to generate the beam fan and project it in the field of view along the projection axis (PROJ-Axis), in the scan-beam-plane, having a triangular or cone-shape pattern that includes the beam fan angle $BF_{ANGLE}$ and angles B and C. The latter two angles B and C are defined between the outer-most edges a and b of the beam fan and the laser line LL. The beam fan can be arranged such that the angle $BF_{ANGLE}$ is divided equally on either side of a central axis ($CENT_{AXIS}$), which can be parallel to the PROJ-Axis. In this example, the $CENT_{AXIS}$ is parallel to both the scan-beam-plane (X-Y plane) and PROJ-Axis (Y-axis).

The laser line LL can be parallel with the beam fan axis (BF-Axis), which is perpendicular to the PROJ-Axis. The width of the laser line LL can be determined by calculating the length (or range) of the central beam (CBL) between a target location and the OLMS device 1 and the $BF_{ANGLE}$. In the case where the laser line LL is perpendicular to the $CENT_{AXIS}$, the beam fan has an isosceles triangle shape, wherein angle B=angle C. As seen in FIG. 1, a portion of the beam fan can impinge on a reflector device 2.

Referring to FIGS. 1 and 2A (or 2B), the OLMS device 1 can be arranged to emit a single coherent laser beam 15, convert the laser beam to a laser line by means of the optical system 20. The optical system 20 can be arranged to convert the laser beam to a laser line by fanning the laser beam 15 into a first beam fan. The optical system 20 can be arranged to focus the first beam fan (including resultant laser line) on to the scanning mirror module 50. The scanning mirror module 50 can include a scanning mirror 50A (shown in FIG. 3A or 3B), which can be arranged to deflect the first beam fan (including, resultant laser line) and project the beam fan (laser line) as a second beam fan in the scan-beam-plane (X-Y plane), with the laser beam diverging (or fanning) to form the beam fan 60 having the beam fan angle $BF_{ANGLE}$.

The scanning mirror module 50 can be arranged to project (or fan) the beam fan 60 in the scan-beam-plane (X-Y plane) and scan the beam fan 60 in a direction orthogonal the scan-beam plane, along the scan axis (SCAN-Axis), according to a scanning motion. The limits of the scanning motion of the beam fan 60 can be defined by a scan beam angle ($SB_{ANGLE}$) (shown in FIG. 3A or 3B). The beam fan 60 can be scanned by the scanning mirror 50A along the SCAN-Axis to detect one or more objects or surfaces located anywhere in a plane perpendicular (for example, the X-Z plane), or a plane parallel (for example, X-Y or Y-Z plane) to the scan-beam-plane of the beam fan 60 that is or comes into the field of view of the OMS device 1. Thus, the OLMS device 1 can generate and scan the beam fan 60 to cover a multidimensional shape (for example, three-dimensional shape), such that, for example, a portion of the scanned beam fan 60 can impinge an object or surface located anywhere along the beam fan axis (BF-Axis) or SCAN-Axis that appears in the field of view of the OLMS device 1, thereby detecting objects or surfaces that might be positioned offset from each other with respect to the SCAN-axis.

The OLMS device 1 can be combined with two or more reflector devices 2. The OLMS device 1 can include multiple scanning mirror modules 50. The scanning mirror module 50 can include a single scanning mirror 50A, or a plurality of scanning mirrors 50A. The OLMS device 1 can be arranged to emit a plurality of laser beams or beam fans simultaneously. The OLMS device 1 can be arranged to emit the laser beams or beam fans such that, when they impinge one or more objects or surfaces, they can appear simultaneously as a plurality of laser dots, laser lines, laser beam areas, or any combination thereof. The laser beam area can appear when the beam fan 60 is scanned along the SCAN-Axis by the scanning mirror module 50. The OLMS device 1 can be arranged to scan one or more of the laser beams or beam fans simultaneously, or at different times. The laser beam, laser line or laser beam area can be arranged in any configuration or shape, as needed for a given application.

The OLMS device 1 can be arranged to adjust the laser beam, beam fan, or laser beam area, for example, by adjusting the laser beam, laser line or laser beam area in one or more dimensions, including, for example, along any one or more of the X-axis, Y-axis, and Z-axis in the Cartesian (or real world) coordinate system or r-, θ-, φ-dimensions in the Spherical coordinate system. The OLMS device 1 can be arranged to be adjustable such that one or more properties of the emitted laser beam 15, first beam fan, or beam fan 60 (including, any resultant laser line LL) can be adjusted, including, for example, direction, wavelength, gain bandwidth, monochromaticity, spatial or temporal profiles, collimation, output power, coherence, polarization, laser beam central axis $C_{AXIS}$, beam fan angle $BF_{ANGLE}$, or scan beam angle $SB_{ANGLE}$.

Figure 2B:
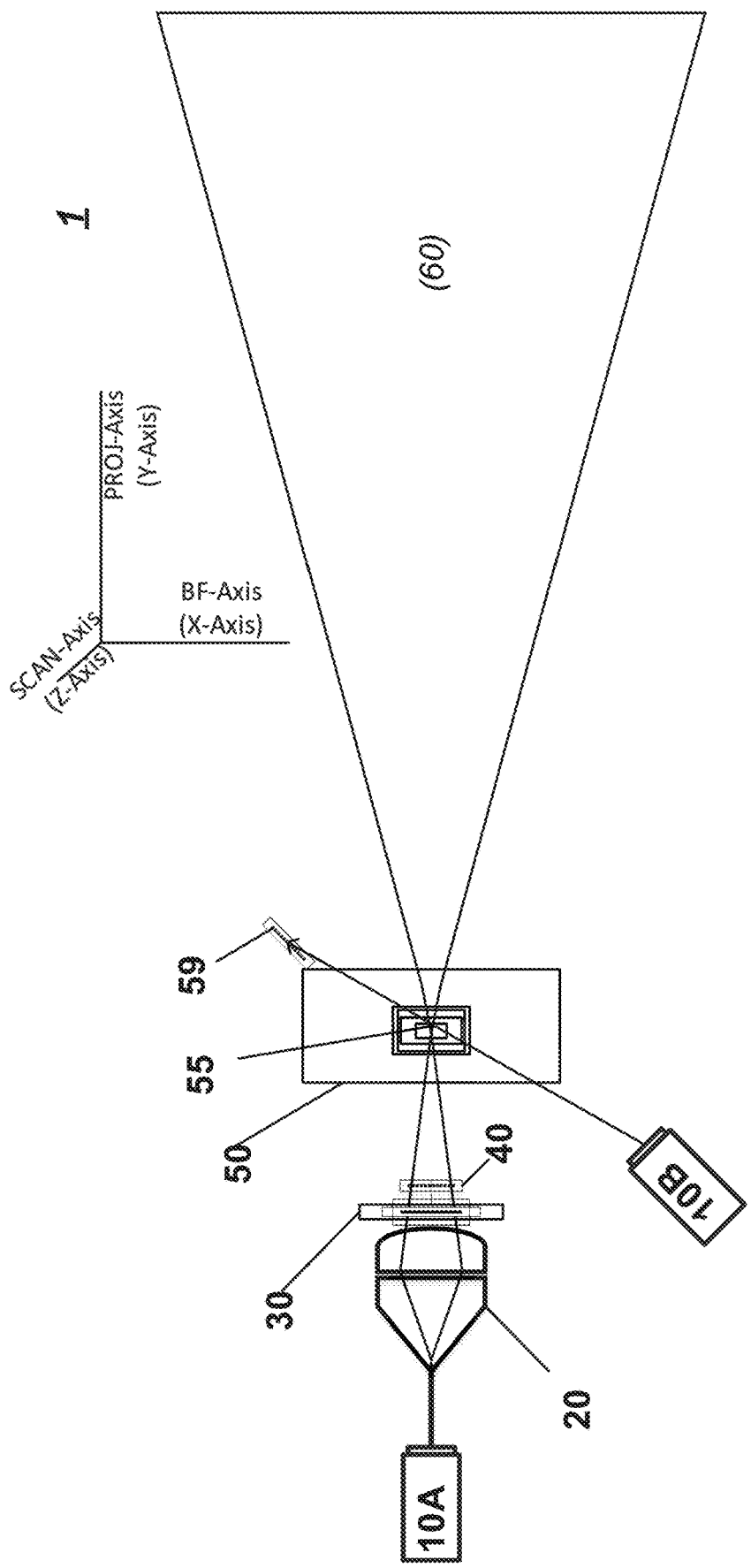
FIG. 2B depicts a top view of another non-limiting embodiment of the OLMS device.

FIGS. 2A and 2B depict simplified top views of respective non-limiting embodiments of the OLMS device 1. Although depicted as the top view, depending on the application or orientation of the OLMS device 1, the views in FIGS. 2A and 2B can be the bottom or a side view of the OLMS device 1. In the embodiment in FIG. 2A, the OLMS device 1 includes the laser source 10, the optical system 20, a line sensor 30, a reflection detector sensor (RDS) array 40, the scanning mirror module 50, and a beam splitter 55, any or all of which can be arranged on a support platform or in a housing, including, for example, the components 100 to 170 of the non-limiting embodiment depicted in FIG. 5. The laser source 10 can be arranged to emit the coherent, highly collimated laser beam 15, which can then be directed to and through the optical system 20.

In the embodiment depicted in FIG. 2B, the OLMS device 1 includes a pair of laser sources 10A, 10B, which can be offset from each other, as seen in the illustration. In this embodiment, the OLMS device 1 can include an angular position sensor (APS) array 59. The APS array 59 can be configured similar to, or the same as, the APS 70. The APS array 59 can be included in addition to the APS array 70 where the scanning mirror 50A a dual-axis steering mirror. Alternatively, the APS array 70 can be omitted where the scanning mirror is a single-axis steering mirror, since the angle position of the mirror 50A can be determined based on the location of impingement on the APS array 59 by the laser beam generated by the laser source 10B. In this latter regard, the position of the mirror 50A is determinative of the location on the APS array 59 that will be impinged by the laser beam from the laser source 10B.

Figure 3A:
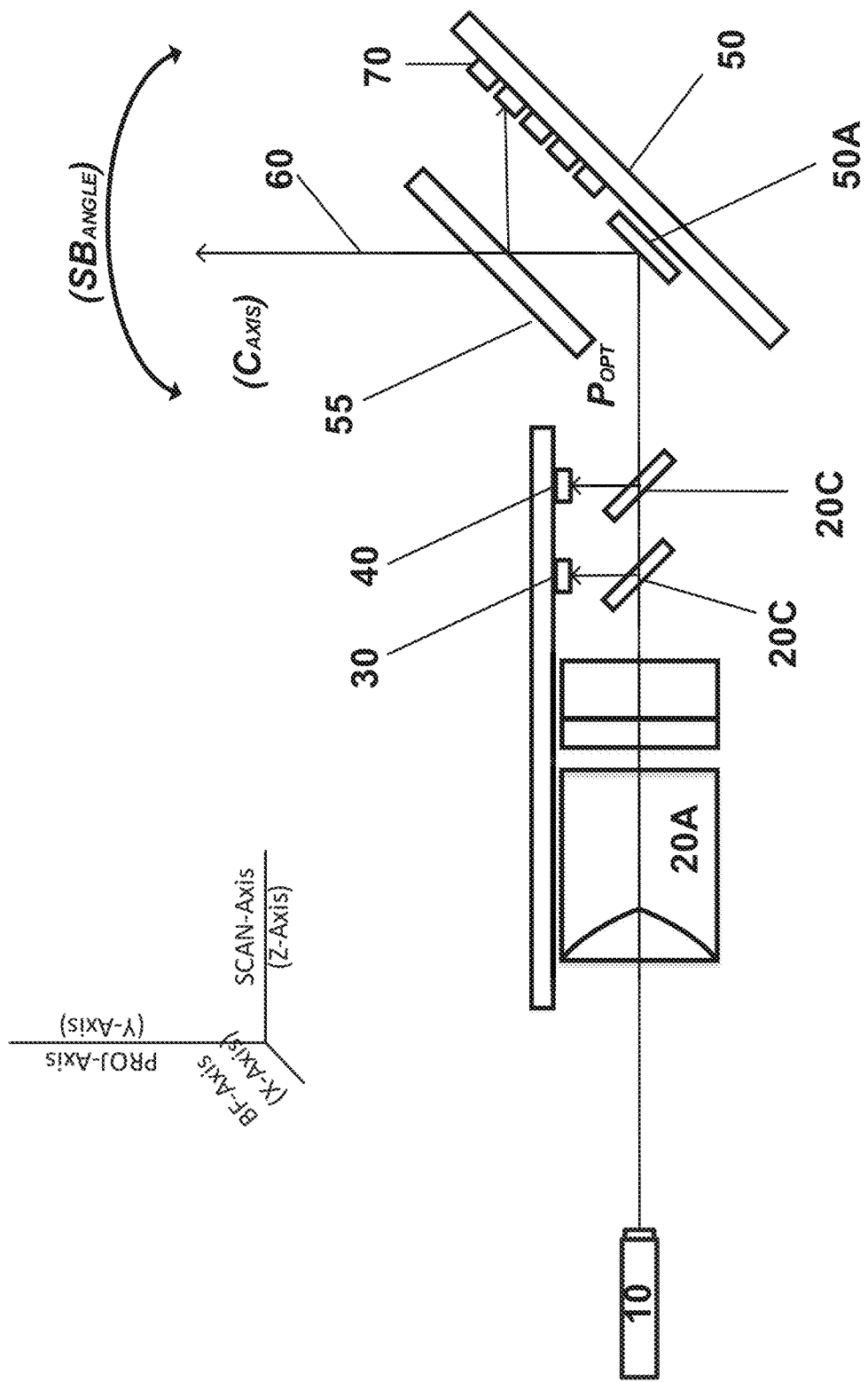
FIG. 3A depicts a simplified side view of the OLMS device in FIG. 2A.
Figure 3B:
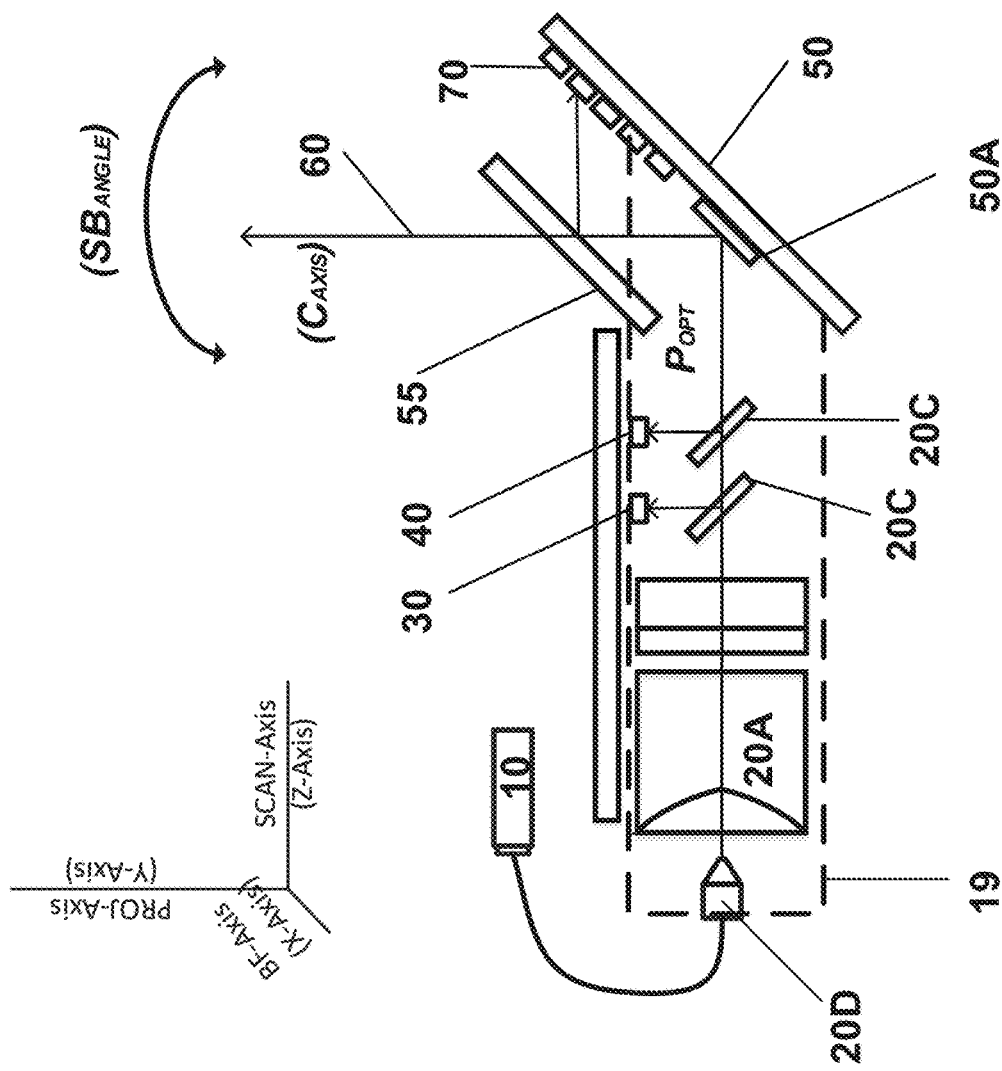
FIG. 3B depicts a simplified side view of another non-limiting embodiment of the OLMS device.

The optical system 20 can be arranged to convert (or fan) the laser beam 15 to the first beam fan (including resultant laser line) and then focus the first beam fan (laser line) on a point or a portion of the scanning mirror 50A (shown in FIG. 3A or 3B). The optical system 20 can be arranged to shape the first beam fan and focus it onto the scanning mirror 50A as a dot or a narrow-width laser line. The scanning mirror 50A can be arranged deflect the laser dot or laser line (first beam fan), allowing the latter to diverge as the beam fan 60 as it projects from the OLMS device 1, at the beam fan angle $BF_{ANGLE}$. Moreover, the scanning mirror 50A can be arranged to scan the beam fan 60 along the SCAN-Axis, in accordance with the scan beam angle $SB_{ANGLE}$, to scan points in the X-Z plane, perpendicular to the scan-beam-plane (X-Y plane).

FIG. 3A depicts a simplified side view of the OLMS device 1. The depicted view can be, instead, the top or bottom view of the OLMS device 1, depending on the position or orientation of the OLMS device 1, which can vary depending on the application.

In an embodiment, parts/components in the OLMS device 1 can be constructed to be modular, so that components can be readily replaceable or removable. For instance, the laser source 10 can be removed and replaces with a laser source having different properties (for example, wavelength, power). Any of the components can be configured to be "plug-and-play" for ease in replaceability.

FIG. 3B depicts a simplified side view of another embodiment of the OLMS device 1. Unlike the embodiment depicted in FIG. 3A, the laser source 10 includes a fiber-coupled laser and a fiber collimator 20D, which can be arranged to focus and align the laser precisely in an architecture 19 that holds the optical system 20, line sensor 30, RDS array 40, scanning mirror module 50, beam splitter 55 or APS array 70. The architecture 19 can include a housing. The architecture 19 can include a M.O.S.T. (Monolithic Optical Structure Technology) platform, which can be arranged to bond parts/components that require critical alignment and stability with a rigid structure that is thermal-agnostic or shock/vibration-agnostic—for example, the alignment between parts/components changes minimally (or not at all) with temperature, vibration, shock or other ambient conditions, thereby providing improved accuracy with ambient variations, including temperature, humidity, pressure, or the like.

Referring to FIG. 3A or 3B, the OLMS device 1 can be arranged to project the beam fan 60 in the scan-beam-plane (X-Y plane) and move or scan the beam fan 60 along the SCAN-Axis, in a direction perpendicular to the scan-beam-plane. The beam fan 60 can be moved according to a scanning motion in either or both directions along the SCAN-Axis, perpendicular to the central axis ($C_{AXIS}$). The scanning motion of the beam fan 60 can be limited to the scan beam angle $SB_{ANGLE}$. The central axis ($C_{AXIS}$) can correspond to the zero (or 0°) position of the scan-beam-plane, which in the embodiment shown in FIG. 3A or 3B can be perpendicular to the laser beam path $P_{OPT}$. The beam fan 60 can be scanned with respect to the central axis $C_{AXIS}$ such the beam fan 60 moves back and forth between $-SB_{ANGLE}/2$ and $+SB_{ANGLE}/2$ in cycles, as it is scanned by the scanning mirror 50A.

The optical system 20 can be arranged to receive the laser beam 15 from the laser source 10 and convert (or fan) it into a laser line by, for example, fanning out the coherent, highly collimated laser beam 15 in one dimension using a laser line generator lens 20A, such as, for example, a Powell lens or a diffractive line generating lens. The laser line can be received from the laser line generator lens 20A and focused using, for example, a cylindrical lens 20B on a point or a narrow line portion on the scanning mirror 50A, as seen in FIG. 3A or 3B. The focused laser line can be directed from the optical system 20 to the scanning mirror 50A along an optical path $P_{OPT}$.

The scanning mirror 50A can be arranged to receive the focused laser line along the optical path $P_{OPT}$ and deflect (or redirect) the laser line along the laser beam central axis $C_{AXIS}$ in the scan-beam-plane. The scanning mirror 50A can be arranged to receive the focused laser line at, for example, a center point, and scan the deflected beam fan 60 according to the scan beam angle $SB_{ANGLE}$. As the beam fan 60 is scanned, it can pass through a beam splitter 55. The beam splitter 55 can be arranged to deflect a portion of the beam fan 60 to an angle position sensor (APS) array 70, allowing the rest of the beam fan 60 to diverge unobstructed as it travels from the OLMS device 1. As the beam fan 60 is scanned, the reflector device 2 can be impinged by a portion of the beam fan 60 and a light beam reflected, even if it is not located in the initial beam-scan-plane, since the beam fan 60 can be scanned in either direction perpendicular to the beam-scan-plane. Once the reflector device 2 is in the field of view of the OLMS device 1, it can be detected based on the reflected light beam and its exact location determined in two-dimensional (2D) space, three-dimensional (3D) space, or four-dimensional (4D) space (for example, spatial coordinates x, y, z. and time t). This determination can be made based on the timing and angle of the reflected beam 65R (shown in FIG. 4), as well as the location of the OLMS device 1 in four dimensions (x, y, z, t) and the position of the scanning mirror 50A at the instant the reflected beam 65R is detected by the RDS array 40.

The scanning mirror 50A can be arranged to scan the beam fan 60 by a scan beam angle $SB_{ANGLE}$, such as, for example, an angle in the range of 0° to 5°, 0° to 10°, 0° to 15°, or any other angle or range of angles with respect to the laser beam central axis $C_{AXIS}$ (shown in FIG. 3A or 3B). The scan beam angle $SB_{ANGLE}$ can be determined for the scanning mirror 50A based on, for example, equipment limitations, configuration or arrangement of hardware components, location of each reflector device 2 with respect to each other and the OLMS device(s) 1, the host application (for example, a control system for a robot, shown in FIG. 8), anticipated range, configurations of the OLMS device 1, or other factors.

In the non-limiting embodiment depicted in FIG. 3A or 3B, the optical system 20 includes the Powell lens 20A, the cylindrical lens 20B and at least one beam splitter 20C. The optical system 20 can include the fiber collimator 20D. The Powell lens 20A is arranged to receive the coherent, highly collimated laser beam 15 from the laser source 10 and produce a straight, uniform, diverging laser line having a predetermined divergence fan angle and uniform line intensity as a first beam fan. The cylindrical lens 20B is arranged to receive the laser line (or first beam fan) from the Powell lens 20A and focus the laser line on a point or a thin, narrow line portion on the scanning mirror 50A, where it can be deflected and allowed to diverge unobstructed as the beam fan 60, having the beam fan angle $BF_{ANGLE}$. The cylindrical lens 20B can be arranged to shape and direct the laser line to, for example, a location at or near the center of the scanning mirror 50A.

The Powell lens 20A can be arranged to have an apex with an aspheric curve that evenly distributes optical power, resulting in minimal intensity variation over the width (including the center portion) of the laser beam line. The fan angle of the Powell lens 20A can be determined based on the configuration, shapes, sizes and materials used for the components in the OLMS device 1, as well as the application for which the OLMS device 1 will be used. For example, for certain, non-limiting applications, the beam fan angle $BF_{ANGLE}$ for beam fan 60 can be set to a value that is less than 15°; whereas, for other applications, the beam fan angle $BF_{ANGLE}$ can be set to an angle value greater than 15°, such as, for example 30°, or greater, depending on the configuration of components in the OLMS device 1, as will be understood by those skilled in the art.

Those skilled in the art will understand how to determine the optimal angle value for the first beam fan and the fan angle $BF_{ANGLE}$, for a given application or configuration for the OLMS device 1. For instance, the Powell lens 20A can be arranged to fan the laser beam 15 to result in a $BF_{ANGLE}$ of, for example, 10°. The beam fan angle $BF_{ANGLE}$ can be set (or selected) by manufacturing (or selecting) the Powell lens 20A to have a material with the necessary refractive index and roof angle to fan the laser beam 15 to obtain the desired fan angle. It is noted that the value of beam fan angle $BF_{ANGLE}$ depends on the refractive index and roof angle of the Powell lens 20A. For example, the steeper the roof angle and the higher the refractive index of the Powell lens 20A, the wider the fan angle $BF_{ANGLE}$ will be.

The straightness and boresight deviation of the laser line output from the Powell lens 20A will depend, at least in part, on the quality of manufacture of the Powell lens 20A, as well as the precision and location of its mounting in the OLMS device 1 with respect to the other components. For example, the Powell lens 20A should be arranged such that the cell of the Powell lens 20A and its interface with the laser beam 15 maintain the roof's perpendicularity to the incident laser beam 15.

The beam splitter 20C can include a single beam splitter or a plurality of beam splitters (for example, two beam splitters), any or all of which can be positioned in the laser beam path $P_{OPT}$, depending on the configuration and positioning of components in the OLMS device 1. In the non-limiting embodiments depicted in FIG. 3A or 3B, the beam splitter 20C has two separate beam splitters. At least one of the beam splitters 20C can be arranged to deflect (or redirect) a portion of a laser beam in the laser beam path $P_{OPT}$ to the line sensor 30; and, at least one other beam splitter 20C can be arranged to deflect (or redirect) a portion of a laser beam to the detector sensor array 40.

The line sensor 30 can include a single line of discrete light responsive elements, or an array having multiple lines of discrete light responsive elements. The line sensor 30 can include a charge-coupled device (CCD) such as, for example, an integrated circuit (IC) chip containing a linear array of linked, or coupled, capacitors. The line sensor 30 can include a multilayer CCD, an active-pixel sensor (APS), an electro-optical sensor, or any other device capable of sensing a portion of the laser beam deflected from the laser beam path $P_{OPT}$ to the line sensor 30. The light responsive elements (pixels) in the line sensor 30 can be arranged as single row or column of elements in a line along a longitudinal axis, which in the embodiments depicted in FIG. 3A or 3B is perpendicular to the laser beam path $P_{OPT}$.

The RDS array 40 can include a one-dimensional or a multidimensional (for example, two-dimensional) array of photodiodes, phototransistors, solaristors, active-pixel sensors (APS), or any other light responsive device or array of discrete light responsive devices capable of detecting a light beam, such as, for example, the reflection beam 65R (shown in FIG. 4), thereby, facilitating detection of a time of reflection of a laser beam by an external reflector device such as the reflector device 2, as well an angle of the reflected light beam. The position of the reflector device 2 can be determined based on the sensed light beam reflected from the reflector device 2, as discussed in great detail below.

As discussed in greater detail below, the OLMS device 1 can include a speedup processor 130 (shown in FIG. 5), such as, for example, high-speed field-programmable gate array (FPGA) integrated circuit (IC), to rapidly process detected reflection beam data and minimize latency. The speedup processor 130 can be arranged to accurately timestamp detected reflection beam data so that each reflector device 2 position can be detected and identified with accuracy. Implementation of the speedup processor 130 together with the central processor 100 (discussed below) can greatly increase field of view detection, processing, and data transfer speeds compared to relying on only the central processor 100. The resultant high refresh rate and low latency can be ideal for real-time control of fast-moving objects such as, for example, manufacturing robots.

Figure 4:
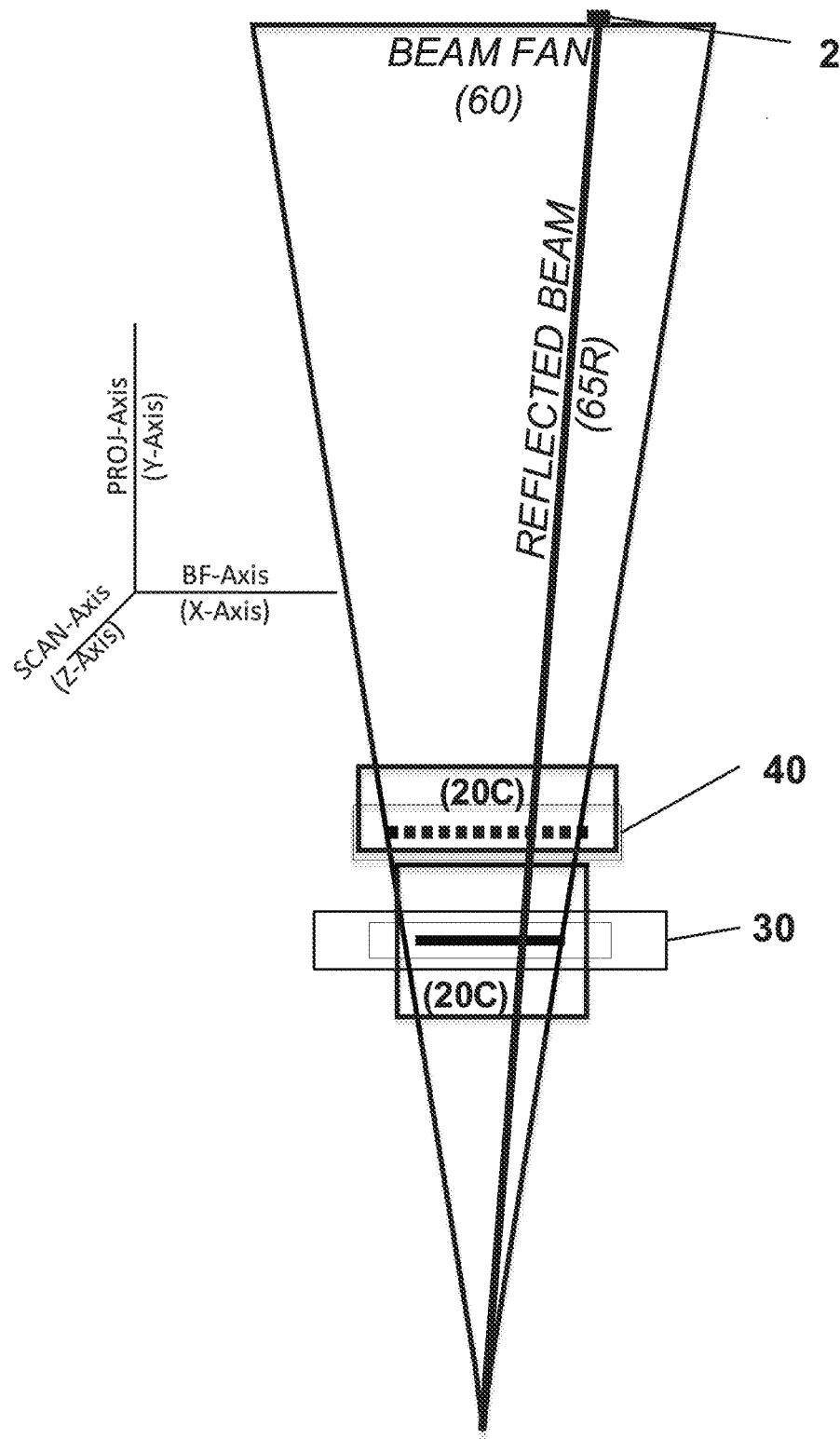
FIG. 4 depicts a non-limiting example where the reflector device in FIG. 1 is impinged by a beam fan projected by the OLMS device in FIG. 2A.

FIG. 4 depicts an embodiment where the reflector device 2 is impinged by the beam fan 60 and a portion of the laser line LL reflected back to the OLMS device 1 as a reflected light beam 65R. As seen, the path the reflected light can take is depicted as the reflected beam 65R. In this example, the beam splitters 20C are located above both the RDS array 40 and the line sensor 30. The beam splitters 20C can be arranged to direct the reflected light 65R from the reflector device 2 to different parts of the RDS array 40 and line sensor 30.

In the non-limiting embodiment depicted in FIGS. 3 and 4, the line sensor 30 includes a line CCD sensor and the RDS array 40 includes a one-dimensional array comprised of five discrete sense photodiodes (PD1, PD2, PD3, PD4, PD5). Each sense photodiode PD1 to PD5 can be arranged to generate a position trigger signal (for example, pulse signal) when it is impinged by a light beam from the beam splitter 20C. Depending on the photodiode that is impinged by the reflected light beam, an angle of the reflected beam 65R can be detected.

At substantially the same time the reflected light beam 65R is received by the RDS array 40, the reflected light beam 65R can be received and captured by a discrete light responsive element (pixel) in the line sensor 30 and a resultant low-voltage signal generated. The image data can be communicated to the speedup processor 130 (shown in FIG. 5) together with the position trigger signal from the sense photodiode (PD1, PD2, PD3, PD4, or PD5), and the location and identity of the reflector device 2 determined. The speedup processor 130 can be arranged to timestamp each data stream received from the line sensor 30, so as to accurately identify the time when the position of each reflector device 2 was detected.

The scanning mirror module 50 can be formed as a single integrated circuit (IC) chip or assembled from a plurality of components. The scanning mirror module 50 can include the scanning mirror 50A and the APS array 70. The scanning mirror 50A and the APS array 70 can be arranged in a closed-loop configuration, with the APS array 70 providing mirror position feedback, which can be used in controlling the scan beam angle $SB_{ANGLE}$ and, thereby, the scanning motion of the beam fan 60. The scanning mirror module 50 can be formed as a single IC chip containing the scanning mirror 50A and the APS array 70. The scanning mirror module 50 can include electronic or optical filters (not shown) to reduce any effects of interference or noise from the beam fan 60 or any laser beam impacting the scanning mirror 50A or the APS array 70.

Figure 5:
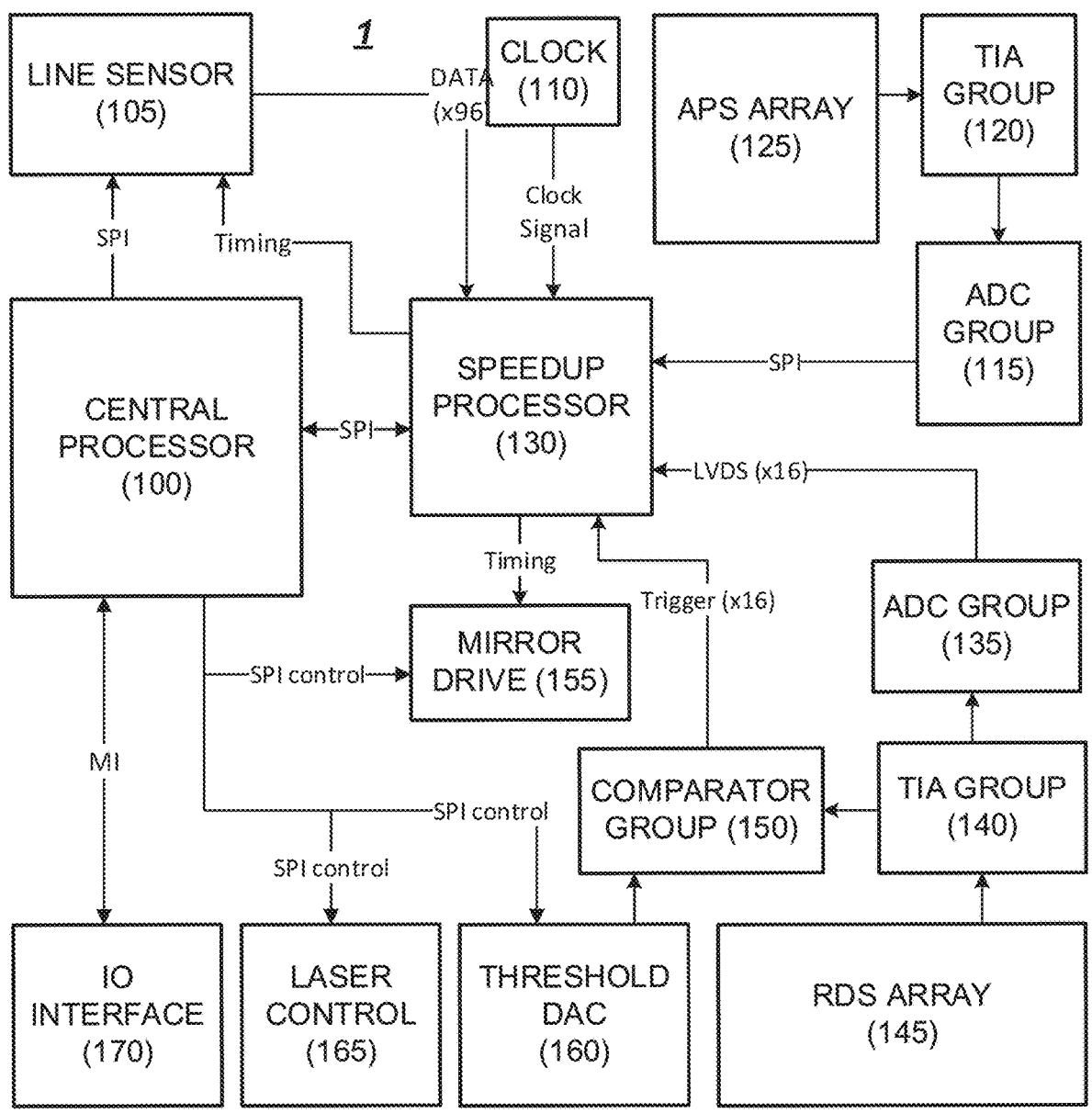
FIG. 5 shows a block diagram of a non-limiting embodiment of the OLMS device.

The scanning mirror module 50 can be connected to, or it can include, either or both the central processor 100 (shown in FIG. 5) and the speedup processor 130 (shown in FIG. 5). The scanning mirror module 50 can be arranged to include any of the components 100 to 170 of the non-limiting embodiment of the OLMS device 1 depicted in FIG. 5.

The APS array 70 can include a configuration of optical position sensors affixed to or formed integrally with the scanning mirror module 50, as seen in FIG. 3A or 3B. The APS array 70 can include an array of discrete light responsive elements, such as, for example, photodiodes. The APS array 70 can include an array of feedback photosensor devices, such as, for example, discrete feedback photodiodes or CCDs. The APS array 70 can be arranged as a one-dimensional array or a multidimensional array (for example, 2D array) of feedback photosensor devices. The APS array 70 can include a high resolution and high-speed line sensor, including, for example, a line CCD. As noted above, the scanning mirror 50A and the APS array 70 can be arranged in a closed-loop configuration.

In a non-limiting embodiment, the line sensor 30 includes a high resolution and high-speed CCD; the scanning mirror 50A includes a single axis MEMS (micro-electro-mechanical system) mirror arranged to scan a volume with a refresh rate of, for example, about 500 Hz; and, the APS array 70 comprises a one-dimensional array of sixteen discrete feedback photodiodes. Each feedback photodiode can be arranged to generate a position feedback signal when it is impinged by a light beam from the beam splitter 55 (shown in FIG. 3A or 3B). The position feedback signal can then be received and processed by the speedup processor 130 (shown in FIG. 5) to determine the scan-beam angle of the fan beam 60 with respect to the $C_{AXIS}$ and, thereby, the position of the scanning mirror 50A. The scan mirror 50A can be controlled in response to the position feedback signal in a closed-loop configuration.

Since CCD line sensors can be limited in how many frames can be captured in each scan, this can present challenges when placing reflector devices 2 close to each other along the SCAN-Axis. For instance, it may become difficult to sample multiple closely spaced reflector devices within the same pass.

Additionally, the RDS array 145 can be arranged to provide timing data in the SCAN-Axis, such as, in a non-limiting embodiment wherein the CCD line sensor may not be practical for timing in the SCAN-Axis.

In an alternative, non-limiting embodiment, of the OLMS device 1, a line sensor 105 can be provided that can avoid the above-noted drawbacks of the CCD line sensor. Instead of attempting to sample all the pixels in the line sensor 105 and read them out in a serial fashion, the line sensor 105 can be arranged to tie each pixel to a threshold comparator. If the threshold light level is exceeded in one or more pixels, this can trigger a high-speed counter to capture the current count value for the timing data. Only pixels which exceed the threshold are then sampled using analog-to-digital-converters (ADCs).

In this alternative embodiment, the data that is communicated to the host controller (for example, robot controller 200, shown in FIG. 8) would be the timestamp for each pixel that exceeded its threshold, the analog levels for those pixels, and their position within the one-dimensional array of pixels. The central processor 100 can be arranged not to send any data on pixels that were not triggered. In this regard, the line sensor 105 and speedup processor 130 can be provided a single integrated circuit (IC) chip, and configured to capture the amplitude and timing and position of pixels that exceed the threshold. This data can then be communicated to the central processor 100 where it can be further processed using calibration data to generate the X (fan axis) and Z (scan axis) angles. It is these angles for each detected reflector device that can be communicated to the robot controller 200 (shown in FIG. 8), and not the raw data.

This alternative embodiment for the line sensor 105 can be implemented to simplify the system design of the non-limiting embodiment of the OLMS device 1 depicted in, for example, FIG. 2A, 2B, or 5, by eliminating the need for the RDS array 145, and thereby reducing cost, size, and bandwidth requirements by reducing the amount of data that needs to be communicated and processed by the host controller.

The scanning mirror 50A can include, for example, a single MEMS mirror, a dual-axis MEMS mirror, a single axis micro-opto-electro-mechanical system (MOEMS) mirror, a dual-axis MOEMS, a single axis coil mirror (CM), a dual-axis CM, or any gimbal-less single or dual-axis mirror device that can meet size, weight, power consumption and performance requirements for inclusion in the OLMS device 1, as will be understood by those skilled in the art.

FIG. 5 shows a block diagram of a non-limiting embodiment of the OLMS device 1, including detection, monitoring and control circuitry. The OLMS device 1 can include the central processor 100, a line sensor 105, a clock 110, a first analog-to-digital converter (ADC) group 115, a first transimpedance amplifier (TIA) group 120, an angle position sensor (APS) array 125, the speedup processor 130, a second ADC (analog-to-digital converter) group 135, a second TIA (transimpedance amplifier) group 140, a reflection detection sensor (RDS) array 145, a comparator group 150, a scan mirror drive 155, a threshold digital-to-analog converter (DAC) 160, a laser control (165) and an input-output (IO) interface 170, each of which can be connected by a communication link or bus. The OLMS device 1 can include one or more buses (not shown), each of which can be connected to any or all the components 100 to 170 by a communication link.

The central processor 100 can include any of various commercially available processors, including for example, a central processing unit (CPU), an ARM (Advanced Risk Machines) CPU, a reduced instruction set computer (RISC), a graphic processing unit (GPU), a general-purpose GPU (GPGPU), a field programmable gate array (FGPA), an application-specific integrated circuit (ASIC), a system-on-a-chip (SOC), a single-board computer (SBC), a complex programmable logic device (CPLD), a manycore processor, multiple microprocessors, or any other computing device architecture. The central processor 100 can include a storage (not shown). The central processor 100 can be arranged to interact with any of the components 105 to 170 to carry out or facilitate the processes included, described or contemplated by this disclosure.

In the non-limiting embodiment depicted in FIG. 5, the central processor 100 includes an ARM CPU.

The central processor 100 can be arranged to communicate and interact with computing resources, computing devices or communicating devices that are external to the OLMS device 1 via the IO interface 170. For instance, the central processor 100 can be arranged to interact with a controller 200 for a manufacturing robot device (shown in FIG. 8), a machine vision system (not shown), or any other controller for a device or machine that can benefit from high-speed, low-latency and accurate detection, location or tracking of objects, surfaces and space in four-dimensional space (x, y, z, t).

Figure 8:
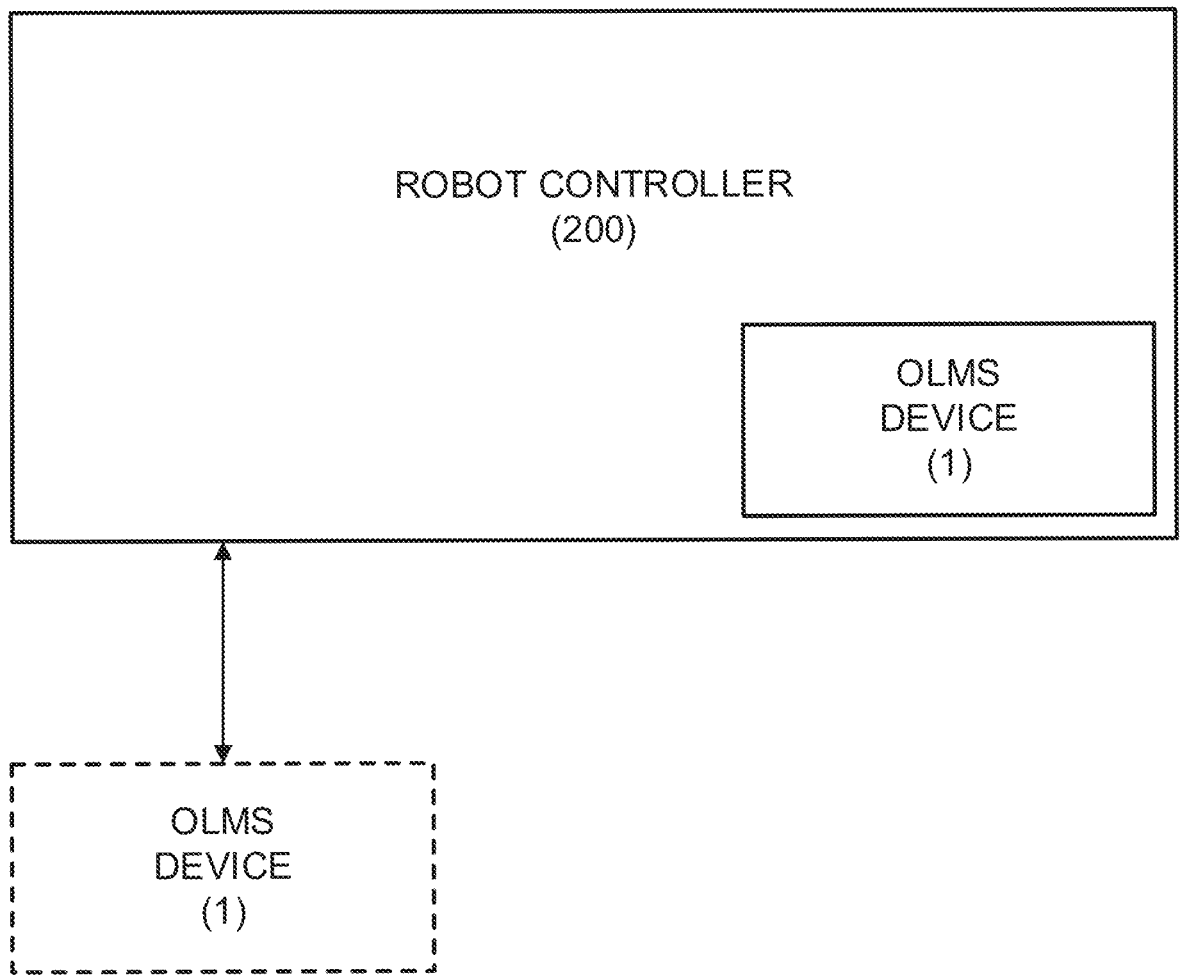
FIG. 8 depicts a non-limiting embodiment of an implementation of the OLMS device in a robot controller.

FIG. 8 depicts a non-limiting embodiment of an implementation of the OLMS device 1 in a robot controller 200 to provide a machine vision system that can be implemented by a manufacturing robot when interacting with its environment, including any objects in the space surrounding the robot (not shown). As seen in FIG. 8, one or more OLMS devices 1 can be implemented, including an internal OLMS device 1 or an external OLMS device 1.

The central processor 100 can be arranged to operate with the speedup processor 130 to control all operations in the OLMS device 1. The central processor 100 can be arranged to interact with or control, for example, the line sensor 105, speedup processor 130, mirror drive 155, threshold DAC 160, laser control 165 or IO interface 170. The central processor 100 can be arranged to communicate and interact with computing resources (not shown), computing devices (not shown) or communicating devices (not shown) external to the OLMS device 1 via the IO interface 170, either directly over one or more communication links or via a network. In the latter instance, communication between the OLMS device 1 and such computing resources or devices can be facilitated via the IO interface 170, which can include an Ethernet interface.

The speedup processor 130 can include, for example, a CPU, an ARM CPU, a GPU, a GPGPU, an FPGA, an ASIC, an SOC, an SBC, a CPLD, a manycore processor, multiple microprocessors, or any other computing device architecture. The speedup processor 130 can include a storage (not shown). The speedup processor 100 can be arranged to interact with any of the components 100 to 170 to carry out or facilitate the processes included, described or contemplated by this disclosure.

In a non-limiting embodiment, the speedup processor 130 is an FPGA that can be configured to use a hardware description language (HDL) to describe the structure and behavior of electronic circuits and components in the OLMS device 1, including the scanning mirror 50A and components 100 to 170. The speedup processor 130 can be programmed, for example, using embedded program code, to process data and control operation of the components in the OLMS device 1, including scanning mirror 50A, line sensor 30, RDS array 40, and APS array 70.

The central processor 100 can be arranged to run an operating system (OS), which can include an operating system (OS) kernel that can control all operations on the OLMS device 1. The OS kernel can include, for example, a monolithic kernel or a microkernel. The OS kernel can be arranged to execute on the central processor 100 and have control over operations in the central processor 100.

The storage (not shown), which can be included in the central processor 100 as mentioned above or located external to the processor, can comprise a non-transitory computer-readable storage medium that can hold executable or interpretable computer resources, including computer program code or instructions that, when executed by the central processor 100, cause the steps, processes or methods in this disclosure to be carried out. The storage (not shown) can include a read-only memory (ROM), a random-access memory (RAM), or a hard disk drive (HDD). The storage (not shown) can provide nonvolatile storage of data, data structures, and computer-executable instructions, and can accommodate the storage of any data in a suitable digital format. A similar storage (not shown) can be included in the speedup processor 130.

A basic input-output system (BIOS) can be stored in the non-volatile memory in the storage (not shown), which can include, for example, a ROM, an erasable programmable read-only memory (EPROM), or an electrically erasable programmable read-only memory (EEPROM). The BIOS can contain the basic routines that help to transfer information or data between any one or more of the components 100 to 170 in the OLMS device 1, such as during start-up.

In the non-limiting embodiment of the OLMS device 1 seen in FIG. 5, the speedup processor 130 includes an FPGA. The OLMS device 1 can be arranged such that speedup processor 130 can capture data from the line sensor 105 while scanning, reset the lines sensor 105 rapidly, capture time accurately, determine the centroid and determine angle data. In an embodiment, conversion of data, including angle determination, can be carried out by the central processor 130.

The line sensor 105 can include the line sensor 30 (shown in FIGS. 2A-4). The line sensor 105 can include a high-speed CMOS (complementary metal-oxide-semiconductor) image sensor developed for applications, such as, for example, machine vision. The line sensor 105 can include a one-dimensional linear array of light responsive elements (pixels), including, for example, pipelined global shutter pixels that allow exposure during read out and CDS (correlated double sampling) operation. The line sensor 105 can be arranged to receive SPI (serial peripheral interface) control signals from the central processor 100 and timing signals from the speedup processor 130, as seen in FIG. 5. The line sensor 105 can be arranged to output beam reflection data to the speedup processor 130, which can be arranged to occur synchronously.

FIG. 7 depicts a non-limiting example of beam reflection data that can be generated by the line sensor 105 and output to the speedup processor 130.

In the non-limiting embodiment seen in FIG. 5, the line sensor 105 includes a Dragster line imager arranged to receive SPI control signals from the central processor 100 and timing signals from the speedup processor 130. The line sensor 105 can be arranged to output beam reflection (or image) data to the speedup processor 130. For instance, the line sensor 105 can include, for example, tens, hundreds, thousands, or more discrete light responsive elements (pixels), each of which can generate a voltage signal upon receiving a light signal. The line sensor 105 can be arranged to convert each voltage signal to a digital signal and output beam reflection data as digital data to the speedup processor 130, which can take the form of the non-limiting example shown in FIG. 7. The speedup processor 130 can be arranged to trigger or control operation of the line sensor 105, including shuttering and readout, by providing timing signals to the line sensor 105. The speedup processor 130 can be arranged to define the state machine timings and output the timing signals to the Dragster line imager in the line sensor 105 as pulse signals.

The speedup processor 130 can be arranged to acquire beam reflection data synchronously from the line sensor 105 and output timing signals to the mirror drive 155 to control the position and operation of the scanning mirror 50A (shown in FIG. 3A or 3B). An entire line of beam reflection data (for example, shown in FIG. 7) can be captured by the line sensor 105 when triggered by the timing signal from the speedup processor 130. The speedup processor 130 can be arranged to receive and pre-process this data to identify the center of any beam reflections detected by one or more discrete elements in the line sensor 105, which, as noted above, can include the line sensor 30 (shown in FIGS. 2A-4). The speedup processor 130 can be arranged to send the center data to the central processor 100, which can convert the center data to angle data, including, for example, the angle position of the beam fan 60 (shown in FIG. 3A or 3B) with respect to the central axis $C_{AXIS}$ (shown in FIG. 4), including the scan beam angle ($SB_{ANGLE}$).

The clock 110 can include a high-speed clock arranged to output clock signals to the speedup processor 130, as well as any of the other components 100 to 170. The speedup processor 130 can use the clock signal from the clock 110 as a precision clock reference to generate timing signals to drive the line imager 105 or mirror driver 155. The speedup processor 130 can use the clock signal for internal processing and calculations. The clock 110 can include, for example a crystal oscillator.

The speedup processor 130 can be arranged to exchange SPI data/instructions with the central processor 100, and to receive SPI data originating from the APS array 125. The speedup processor 130 can be arranged to receive clock signals from the clock 110, low-voltage differential signals (LVDS) originating from the RDS array 145 and trigger signals from the comparator 150. The trigger signals from the comparator group 150 can include a threshold value for each photodiode in the RDS array 145, which can be set to reduce or eliminate any likelihood of false positives by photodiodes due to, for example, noise. The speedup processor 130 can use the clock signals to time position feedback signals originating from the APS array 125. The position feedback signals can include pulse signals. These timings can then be supplied from the speedup processor 130 to the central processor 100, which can convert the timings into angle data to determine the angular position of the beam fan 60 (shown in FIG. 3A or 3B) with respect to the center axis $C_{AXIS}$, and thereby the position of the scanning mirror 50A (shown in FIG. 3A or 3B) and scan beam angle ($SB_{ANGLE}$). The speedup processor 130 can be arranged to capture the time for both rising and falling edges of the optical pulses falling on the RDS array 145 and APS array 125. This can enable the speedup processor 130 (or central processor 100) to calculate the time of the pulse center and reduce the effects of amplitude variation on the overall accuracy of the system. Thus, when beam fan 60 is located in a given position with respect to the $C_{AXIS}$, a corresponding one of the feedback photodiodes will be illuminated and activated to generate a position feedback signal for mirror motion feedback, as seen in FIG. 3A or 3B.

The speedup processor 130 can be arranged to receive SPI data from the ADC group 115, which in-turn can receive position feedback (pulse) signals originating from discrete feedback photodiodes in the APS array 125. The position feedback signals can be amplified by the TIA group 120 before being input to the ADC group 115. In this embodiment, three separate channels are provided, one for each of the photodiodes in the APS array 125. The channels include three respective ADCs in the ADC group 115 connected to three respective TIAs in the TIA group 120, each of which is in turn connected to a respective feedback photodiode in the APS array 125. In this embodiment, the APS array 125 has three discrete feedback photodiodes. The APS array 125 can comprise the APS array 70 (shown in FIG. 3A or 3B).

Thus, when beam fan 60 is located in a given position with respect to the $C_{AXIS}$, as seen in FIG. 3A or 3B, a corresponding one of the position feedback photodiodes in the APS array 125 will be illuminated and activated to generate a position feedback pulse signal for mirror motion feedback, which is then amplified, converted to digital form and input as SPI data to the speedup processor 130, as seen in the example in FIG. 5. The speedup processor 130 can be arranged to use the more detailed ADC data from the ADC group 135 (or 115) to further improve the accuracy by using the best fit or center of gravity algorithms to better detect the center of the feedback pulses. The position feedback signals originating from the feedback photodiodes can be used to correct variations in the scan pattern of the scanning mirror 50A and, thereby, the beam fan 60 (shown in FIG. 3A or 3B).

The speedup processor 130 can be arranged to receive one or more LVDS signals from any ADC in the ADC group 135, which in-turn receives light sense signals originating from discrete photosensors in the RDS array 145. As seen, the light sense signals can be amplified by the TIA group 140 before being input to the ADC group 135. In this embodiment, sixteen separate channels are provided, each one corresponding to a unique photodiode in the RDS array 145. The channels include sixteen respective ADCs in the ADC group 135 connected to sixteen respective TIAs in the TIA group 140, each of which is in-turn connected to a respective discrete line sense photodiode in the RDS array 145. The RDS array 145 can comprise the RDS array 40 (shown in FIGS. 2-4).

In addition to the LVDS signals from the ADC group 135, the speedup processor 130 can receive a comparator trigger signal from the comparator group 150, which in the non-limiting embodiment seen in FIG. 5 comprises sixteen comparators. Each comparator trigger signal can be processed by the speedup processor 130 so as to filter out noise that might exist, including noise that might otherwise result in a false positive.

An input of each of the comparators in the comparator group 150 can be connected to a respective TIA in the TIA group 140. Another input of each of the comparators in the comparator group 150 can be connected to the threshold DAC 160, which can provide a reference threshold value against which each light sense signal from the sense photodiodes in the RDS array 145 is compared and the result output to the speedup processor 130. The reference threshold value can be adjusted by the central processor 100 by means of an SPI control signal that is applied to the threshold DAC 160.

Upon receiving the LVDS signals from the ADC group 135, the speedup processor 130 can trigger the line sensor 105 to capture an entire line of image data. The line sensor 105 can be arranged to be directly triggered if any of the RDS array comparators, for example, in the comparator group, are triggered. In the embodiment comprising the FPGA, the speedup processor 130 can be arranged to go through an OR function in the FPGA, or a diode OR function if an FPGA delay is undesirable or too long. The speedup processor 130 can then pre-process this image data to identify the center of any beam reflections that might be sensed (for example, reflected beam 65R, shown in FIG. 4). The beam reflection data, including center data, can be output from the speedup processor 130 to an SPI input of the central processor 100, which can then be used by the central processor 100 to determine the angle data. If the angle of the scanning mirror 150A is known at the time of reflection, then the angle between the OLMS device 1 and the reflector device 2 can be determined. By using triangulation, multiple OLMS devices 1 or multiple reflector devices 2 can be used to determine the range to a target and its lateral position. The central processor 130 can be arranged to use calibration data to convert the time value into an angle value for a reflector device positioned within the OLMS device's field of view, with a known angle between the reflector device and the OLMS device 1. The OLMS device 1 can be arranged to rotate a known set of angles to generate a calibration table that equates a time value to an angle value.

The speedup processor 130 can be arranged, together with the central processor 100, to use the image data from the line sensor 105, the position feedback signals from the APS 125, and light sense signals from the RDS 145 to determine the position of the reflector devices 2 (shown in FIG. 1), as well as the scan beam angle $SB_{ANGLE}$ of the scanning mirror 50A (shown in FIG. 3A or 3B). The beam reflection (image) data from the line sensor 105 can be used to timestamp beam reflection data (for example, data for reflected beam 65R, shown in FIG. 4) against an external synchronization signal, such as, for example, the clock signal from the clock 110. This data can be used by, for example, the central processor 100 to correct variations in the scan pattern of the scanning mirror 50A. Such variations can be corrected, for example, via SPI control signals from the central processor 100 to the mirror drive 155 (shown in FIG. 5).

By using programmable logic in the speedup processor 130, the processor can be arranged to process high-speed data from the line sensor 105 and photodiode inputs from the RDS array 145 in parallel rather than sequentially as the central processor 100 would be forced to do in the absence of the speedup processor 130. This means that the combination of central processor 100 and speedup processor 130 can process the data far quicker than would be possible without the speedup processor 130.

As seen in the embodiment shown in FIG. 5, the speedup processor 130 can be used for real-time beam reflection data capture and processing. The speedup processor 130 can be arranged to be programmable using the SPI interface. All modes of operation of the speedup processor 130 can be arranged to be programmable using the SPI interfaces, including any internal exposure triggers, read-out timings and high-speed clock signals that are generated by, for example, a programmable on-board sequencer and phase-lock loop (PLL). The speedup processor 130 can also be arranged for external triggering and exposure programming, as well as multiple integrated high-dynamic range modes where extended optical dynamic ranging is desirable.

The threshold DAC 160 can be arranged to apply a threshold reference value as an input to the comparator group 150.

The mirror drive 155 can be arranged to control and drive the scanning mirror 50A (shown in FIG. 3A or 3B), including the position of the scanning mirror 50A in real-time. The mirror drive 155 can be arranged to control or maintain the angle of the beam-scan-plane in accordance with the scan beam angle $SB_{ANGLE}$.

The laser control 165 can be arranged to control the laser source 10 (shown in FIG. 3A or 3B), as well as the properties of the laser beam 15 emitted by the laser source 10, such as, for example, ON/OFF, wavelength, gain bandwidth, monochromaticity, spatial or temporal profiles, collimation, output power, coherence, polarization, laser beam central axis $C_{AXIS}$, beam fan angle $BF_{ANGLE}$.

The IO interface 170 can facilitate communication and transfer of data between the OLMS device 1 and external computing resources, computing devices or communicating devices, either directly or via a network (not shown). The IO interface 170 can be arranged to connect to a network (not shown). The IO interface 170 can include an Ethernet interface. The IO interface 170 a bus, a USB bus, or a USB RS422/RS485. The IO interface 170 can include a wired or wireless communication network interface (not shown) or a wired or wireless modem (not shown). When used in a local area network (LAN), the IO interface 170 can connect to the LAN network through the communication network interface; and, when used in a wide area network (WAN), it can connect to the WAN network through the modem. The modem (not shown) can be connected to a system bus via, for example, a serial port interface (not shown). The IO interface 170 can include a receiver (not shown), transmitter (not shown), transceiver (not shown), modulator (not shown) or demodulator (not shown).

FIG. 6 shows a timing diagram for a non-limiting example of an OLMS process that can be performed by the embodiment of the OLMS device 1 depicted in FIG. 5. The timing diagram is for an embodiment of the OLMS device 1 in which the RDS array 40 consists of five reflection sense diodes (PD1, PD2, PD3, PD4, PD5).

Referring to FIGS. 3A-6 contemporaneously, the embodiment of the OLMS device 1 depicted in FIG. 5 can be combined with the laser 10, optical system 20, line sensor 30, RDS array 40, scanning mirror module 50 and beam splitter 55 depicted in FIG. 3A or 3B. As noted above, the line sensor 105 can include the line sensor 30, the RDS array 125 can include the RDS array 40, and the APS array 145 can include the APS array 70. Under control of the central processor 100, the laser source 10 can be turned ON by the laser control 165 and the beam fan 60 emitted from the OLMS device 1 in the field of view (shown in FIG. 4). The beam fan 60 can be scanned along the SCAN-Axis in the field of view by the scanning mirror 50A under control of the mirror drive 155, thereby moving the beam fan 60 in either direction along the SCAN-Axis. In this embodiment, the SCAN-Axis is perpendicular to the central axis $C_{AXIS}$ (shown in FIG. 3A or 3B). Thus, a three-dimensional volume in the field of view can be scanned and detected by the OLMS device 1, including all points in the field of view.

During the time the beam fan 60 is emitted by the OLMS device 1, the position of the scan beam fan angle $SB_{ANGLE}$ is detected and monitored by feedback photodiodes in the APS array 125 for angle detection and motion control of the scanning mirror 50A. This is done by deflecting a portion of the beam fan 60 by the beam splitter 55 on to the APS array 125 (as shown, for example, in in FIG. 3A or 3B), and monitoring any feedback position signals that are generated by discrete feedback photodiodes in a closed-loop.

Referring to FIG. 4, when the beam fan 60 impinges on the reflector device 2, the light beam 65R is reflected back to the OLMS device 1, passing through the beam splitter 55 (shown in FIG. 3A or 3B) and being deflected by the scanning mirror 50A along the optical path $P_{OPT}$. A portion of the reflected beam 65R is deflected to the RDS array 145 by the beam splitter 20C nearest the scanning mirror 50A (for example, as shown in FIG. 3A or 3B). The remaining portion of the reflected beam 65R is deflected to the line sensor 105 (for example, as shown in FIG. 3A or 3B) by the other beam splitter 20C.

During operation of the OLMS device 1, the speedup processor 130 receives the clock signal from the clock 110 and can count clock cycles. The line sensor 105 can accurately detect the position of any reflector devices 2 within the span of the laser line LL. The discrete reflection sensor photodiodes on the RDS array 145 can be used for detecting the time of any reflection of light beam, such as, for example, the reflected beam 65R (shown in FIG. 4) and, therefore, the position of the reflector device 2 within the scan direction of the scanning mirror 50A. Using multiple discrete reflection detector sensors on the RDS array 145 allows the OLMS device 1 to discriminate between reflector devices if more than one reflector device is present at any point in the scan-beam-plane for the reflector timing within the scan.

Referring to FIGS. 4, 6 and 7, the OLMS device 1 can detect and identify the reflector device 2 within its field of view. The reflected beam 65R, when it impinges the RDS array 145 can impinge at least one discrete reflection detector sensor, or nine sensors in the case of the non-limiting embodiment depicted in FIG. 7. In FIG. 7, the values can correspond to the intensity (or power) level of illumination of the portion of the reflected beam 65R impinging on the corresponding reflection detector sensor in the RDS array 145.

When the reflection beam 65R impinges a location on the RDS array 145, a pulse signal can be generated and output to the speedup processor 130 (shown in FIG. 5), indicating the presence of the reflector device 2 within the scan-beam plane. The pulse signal can be used by the speedup processor 130 to trigger the line sensor 105, to ensure that it only captures data from angles where there is actually a reflector device present. The line sensor 105 can be configured to initiate image capture beginning with the falling edge of the pulse signal and continuing for a predetermined number of clock cycles before triggering the line sensor shutter, at which point the image (or beam reflection) data can be output from the line sensor 105 to the speedup processor 130. FIG. 7 depicts a non-limiting example of a data stream output by line sensor 30 for the reflection beam 65R, indicating the position of the reflector device 2 in the field of view, within the axis perpendicular to the scan axis.

Resolution and accuracy in the line sensor 105 can be improved or enhanced by including and executing a center of gravity algorithm in the central processor 100 (or speedup processor 130) to compute the centroid of the beam reflection data, such as, for example, the beam reflection data depicted in FIG. 7 for the reflected beam 65R, thereby providing for sub-pixel resolution. In this regard, the OLMS device 1 can include a centroid determiner module (not shown), which can include any of a number of algorithms to perform this calculation, including, for example, any of the algorithms described in the article titled "*A comparison of some techniques for the subpixel location of discrete target images*," by M. R. Shortis, et al., published October 1994, Proceedings of SPIE—The International Society for Optical Engineering. The centroid determiner module can be provided as a separate device or computing resource, or included in the central processor 100 or speedup processor 130.

The speedup processor 130 can be arranged to time the pulses from the RDS array 145, which can then be output to the central processor 100. These timings can then be converted by the central processor 100 into angle data in the scan axis for the reflector devices. This data can also be used to timestamp the beam reflection data against an external synchronization signal.

As described above, the speedup processor 130 can be arranged to take data from the line sensor 105 at high speed, capturing an entire line of beam reflection data each time a pulse signal is received from one of the photodiodes in the RDS array 145. The speedup processor 130 can pre-processes this data to identify the center of any reflection beam. The center data can then be output to the central processor 100, which can be arranged to convert the data into X/Y (or X/Y/Z) angle data and fine-tune the angle data according to the center data, to provide an accurate angle determination for the beam fan 60 and reflected beam 65, as well as reflector device 2 location.

The X/Y (or X/Y/Z) angular data can then be communicated by the central processor 100 to the host (not shown) via the IO interface 170. The host can include, for example, a manufacturing robot (not shown) having the robot controller 200 (shown in FIG. 8). The timestamp data can also be communicated to the host, allowing the host to accurately determine the velocity/acceleration of any reflectors in motion.

As discussed above, the OLMS device 1 is arranged to control the scan mirror 50A motion in order to ensure it is consistent; and, it uses the feedback sensors to correct the scan amplitude in real-time. The OLMS device 1 can be arranged to hold and store calibration data used to convert the time and image sensor data into angular data for the host.

The terms "a," "an," and "the," as used in this disclosure, means "one or more," unless expressly specified otherwise.

The term "backbone," as used in this disclosure, means a transmission medium that interconnects one or more computing devices or communicating devices to provide a path that conveys data signals and instruction signals between the one or more computing devices or communicating devices. The backbone can include a bus or a network. The backbone can include an ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The terms "communicating device" and "communication device," as used in this disclosure, mean any hardware, firmware, or software that can transmit or receive data packets, instruction signals, data signals or radio frequency signals over a communication link. The device can include a computer or a server. The device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G, or 5G cellular standards, or Bluetooth. A communication link can include, for example, an RS-232, RS-422, RS-485, or any other suitable serial interface.

The terms "computer," "computing device," or "processor," as used in this disclosure, means any machine, device, circuit, component, or module, or any system of machines, devices, circuits, components, or modules that are capable of manipulating data according to one or more instructions. The terms "computer," "computing device" or "processor" can include, for example, without limitation, a communicating device, a computer resource, a processor, a microprocessor (μC), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, μCs, CPUs, GPUs, ASICs, general purpose computers, super computers, personal computers, laptop computers, palmtop computers, notebook computers, desktop computers, workstation computers, or servers.

The terms "computing resource" or "computer resource," as used in this disclosure, means software, a software application, a web application, a web page, a computer application, a computer program, computer code, machine executable instructions, firmware, or a process that can be arranged to execute on a computing device as one or more processes.

The term "computer-readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The terms "including," "comprising" and their variations, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "server," as used in this disclosure, means any combination of software or hardware, including at least one computing resource or at least one computer to perform services for connected communicating devices as part of a client-server architecture. The at least one server application can include, but is not limited to, a computing resource such as, for example, an application program that can accept connections to service requests from communicating devices by sending back responses to the devices. The server can be configured to run the at least one computing resource, often under heavy workloads, unattended, for extended periods of time with minimal or no human direction. The server can include a plurality of computers configured, with the at least one computing resource being divided among the computers depending upon the workload. For example, under light loading, the at least one computing resource can run on a single computer. However, under heavy loading, multiple computers can be required to run the at least one computing resource. The server, or any if its computers, can also be used as a workstation.

The terms "send," "sent," "transmission," or "transmit," as used in this disclosure, means the conveyance of data, data packets, computer instructions, or any other digital or analog information via electricity, acoustic waves, light waves or other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An orthogonal laser metrology sensor system for detecting an object and its position in a field of view of a beam fan, the system comprising:
   a reflection detector sensor array arranged to detect a light beam reflected by the object impinged by the beam fan in the field of view and output a reflected beam position trigger signal;
   a line sensor arranged to capture an image of the reflected light beam and output beam reflection data corresponding to the light beam;
   an angle position sensor array arranged to detect an angle of the beam fan with respect to a central axis and output a beam fan position signal; and
   a speedup processor arranged to
      receive the reflected beam position trigger signal,
      receive the beam reflection data,
      receive the beam fan position signal, and
      output the beam reflection data to a central processor,
   wherein a position of the object in the field of view is determined based on the beam reflection data and beam fan position signal.

2. The system in claim 1, further comprising:
   a centroid determiner module arranged to process the beam reflection data and determine a center of the reflected light beam based on the beam reflection data.

3. The system in claim 1, further comprising:
   a comparator arranged to compare the reflected beam position trigger signal against a threshold value and output a pulse signal to an input of the speedup processor.

4. The system in claim 1, further comprising:
   a mirror drive arranged to receive a timing signal from the speedup processor and a control signal from the central processor to drive a scanning mirror.

5. The system in claim 1, wherein the line sensor includes an input for receiving a timing signal from the speedup processor to control the capture of the image of the reflected light beam.

6. The system in claim 1, further comprising:
   a laser source arranged to emit a laser beam; and
   an optical system arranged to fan the laser beam to a laser line and focus the laser line along an optical path to a scanning mirror.

7. The system in claim 6, wherein the laser source comprises a fiber-coupled laser, and wherein the optical system comprises a fiber collimator.

8. The system in claim 6, further comprising:
   a monolithic optical structure technology (MOST) platform having a rigid structure that provides alignment and stability, wherein the monolithic optical structure technology platform comprises the optical system,
   wherein the optical system comprises at least one of:
      a laser line generator lens arranged to convert a laser beam to a laser line;
      a beam splitter system arranged to redirect a reflected light beam to the reflection detector sensor array or the line sensor; and
      a scanning mirror module.

9. The system in claim 6, wherein the optical system comprises:
   a beam splitter system arranged to redirect the reflected light beam to the reflection detector sensor array and the line sensor.

10. The system in claim 9, wherein the beam splitter comprises:
    a first beam splitter arranged to redirect a portion of the reflected light beam to the reflection detector sensor array; and
    a second beam splitter arranged to redirect another portion of the reflected light beam to the line sensor.

11. The system in claim 1, further comprising:
    a scanning mirror arranged to deflect and scan the beam fan along a scan axis,
    wherein beam fan is projected in a scan-beam-plane, and wherein the scan axis is perpendicular to scan-beam-plane.

12. The system in claim 1, wherein the speedup processor comprises a field-programmable gate array.

13. The system in claim 1, wherein the central processor comprises an advanced reduced instruction set computer (RISC) machine central processing unit.

14. The system in claim 1, wherein the object comprises a reflector device.

15. The system in claim 1, further comprising:
    a modular structure having a housing and a platform arranged for removal and replacement of at least one of:
    the reflection detector sensor array;
    the line sensor;
    the angle position sensor array;
    the speedup processor arranged;
    an optical system; and
    a scanning mirror module.

16. The system in claim 1, further comprising:
    a plurality of orthogonal laser metrology sensor modules, each being arranged to detect an object and its position in a field of view of a beam fan, wherein the plurality of orthogonal laser metrology sensor modules are configured to provide a 360-degree field of view in aggregate coverage.

17. An orthogonal laser metrology sensor system for detecting an object and its position in a field of view of a beam fan, the system comprising:
   a line sensor arranged to capture an image of a light beam reflected by the object impinged by the beam fan in the field of view and output beam reflection data corresponding to the light beam;
   an angle position sensor array arranged to detect an angle of the beam fan with respect to a central axis and output a beam fan position signal; and
   a speedup processor arranged to receive the beam reflection data and the beam fan position signal and output the beam reflection data to a central processor,
   wherein a position of the object in the field of view is determined based on the beam reflection data and the beam fan position signal.

18. The system in claim 17, wherein the speedup processor comprises a field-programmable gate array.

19. The system in claim 17, wherein the central processor comprises an advanced reduced instruction set computer (RISC) machine central processing unit.

20. The system in claim 17, wherein the object includes a reflector device or a retro-reflector device.

21. The system in claim 17, further comprising:
   a fiber-coupled laser to emit a laser beam; and
   an optical system arranged to fan the laser beam to a laser line and focus the laser line along an optical path to a scanning mirror, wherein the optical system comprises a fiber collimator.

22. The system in claim 21, further comprising:
   a monolithic optical structure technology (MOST) platform having a rigid structure that provides alignment and stability, wherein the monolithic optical structure technology platform comprises the optical system,
   wherein the optical system comprises at least one of:
      a laser line generator lens arranged to convert a laser beam to a laser line;
      a beam splitter system arranged to redirect a reflected light beam to the reflection detector sensor array or the line sensor; and
      a scanning mirror module.

23. The system in claim 21, further comprising:
   a modular structure having a housing and a platform arranged for removal and replacement of at least one of:
      a reflection detector sensor array;
      the line sensor;
      the angle position sensor array;
      the speedup processor arranged;
      an optical system; and
      a scanning mirror module.

24. The system in claim 21, further comprising:
   a plurality of orthogonal laser metrology sensor modules, each being arranged to detect an object and its position in a field of view of a beam fan,
   wherein the plurality of orthogonal laser metrology sensor modules are configured to provide a 360-degree field of view in aggregate coverage.

25. A computer-implemented method for, when executed by one or more processors, performing orthogonal laser metrology to detect an object and its position in a field of view of a beam fan, the method comprising:
   detecting a light beam reflected by the object impinged by the beam fan in the field of view;
   generating a reflected beam position trigger signal based on the reflected light beam;
   capturing an image of the reflected light beam based on the reflected beam position trigger signal;
   generating beam reflection data corresponding to the captured image of the reflected light beam;
   detecting an angle of the beam fan with respect to a central axis;
   generating a beam fan position signal based on the detected angle of the beam fan; and
   determining a position of the object in the field of view based on the beam reflection data and the beam fan position signal,
   wherein:
      the beam fan is scanned along a scan axis,
      the beam fan is projected in a scan-beam-plane, and
      the scan axis is perpendicular to the scan-beam-plane.

26. The computer-implemented method in claim 25, further comprising
   controlling a scanning mirror based on the beam fan position signal.

27. The computer-implemented method in claim 25, further comprising:
   sending position data to a robot controller, the position data being indicative of the position of the object in real-time.

* * * * *